J. DANA.
SEED-PLANTER.

No. 174,785. Patented March 14, 1876.

Witnesses.
Chas. C. Bishop
Yoon Pike

Inventor.
Joseph Dana,
By. Parker H. Sweet, Jr. & Co.
Att'ys.

UNITED STATES PATENT OFFICE.

JOSEPH DANA, OF MITCHELL, INDIANA.

IMPROVEMENT IN SEED-PLANTERS.

Specification forming part of Letters Patent No. 174,785, dated March 14, 1876; application filed October 16, 1875.

*To all whom it may concern:*

Be it known that I, JOSEPH DANA, of Mitchell, in the county of Lawrence and State of Indiana, have invented certain new and useful Improvements in Seed-Planters; and I do hereby declare that the following is a full, clear, and exact description of the same, reference being had to the accompanying drawing, forming a part of this specification; in which—

Figure 1:
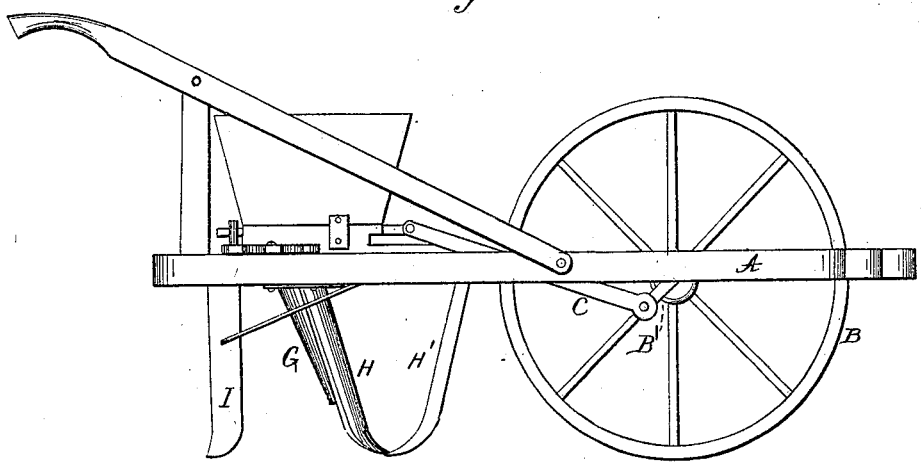
Figure 2:
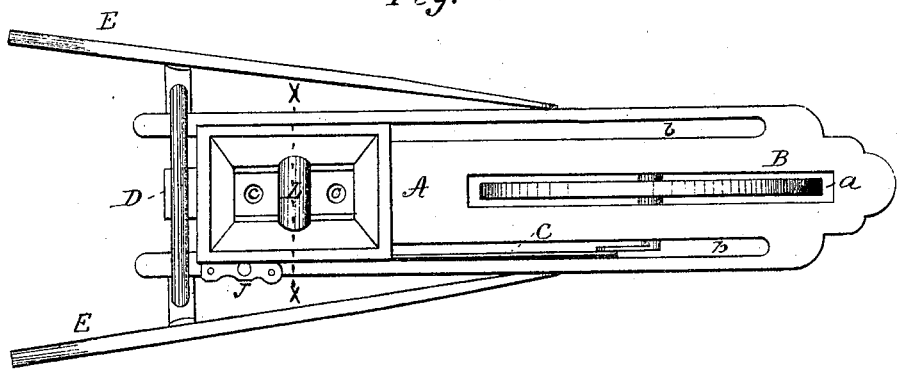
Figure 3:
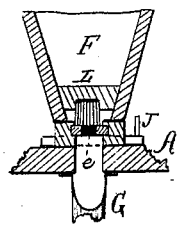

Figure 1 is a side elevation of the planter. Fig. 2 is a top-plan view of the same; and Fig. 3 is a section taken on the line $x\ x$ of Fig. 2.

Similar letters of reference occurring on the several figures indicate corresponding parts.

My invention has for its object to furnish an improved machine for planting seed; and it consists in the general construction and arrangement of the several parts as will hereinafter be more fully described, and pointed out in the claim.

Referring to the drawings, A represents a frame, made of either wood or cast-iron as may be deemed preferable, and provided with a central longitudinal opening, $a$, and two side openings, $b\ b$. It may be observed that this frame or beam is constructed in a single piece, and the openings $a\ b\ b$ cut out if the material used be of wood, but if the beam be made of iron the openings may be formed in the process of casting. The advantages of this construction of frame will be readily apparent, inasmuch as there are no separate pieces to become loose or detached, which would render the working of the several parts of a planter inoperative or imperfect, also the whole frame is rendered stronger and lighter. B represents the bearing-wheel arranged to work in the opening $a$, and having a crank-shaft, B′, to which is connected the pitman C, which operates the seed-dropping slide D. The hopper F is situated on the rear upper part of the frame or beam A, and has an opening at its lower end for the seed to drop into the spout G. The seed-slide D works longitudinally through the bottom of the hopper, and is provided with seed-cells, $c$, of which any suitable number and size to accommodate the various kinds of seeds to be sown may be used. A cleat, L, is secured transversely to the bottom of the hopper, and is provided with a brush consisting of bristles, the ends of which rest upon the seed-slide D, the object of which is to prevent the loss of the grain by waste, allowing only of the cells being properly filled for discharge into the seed-spout G. The pitman C, it will be observed, works through one of the side openings $b$ in the frame or beam A, and if it is found desirable to sow a double furrow, a second seed-slide, operated in the same manner, can be attached on the opposite side. A second slide, J, having an opening, $e$, passes transversely under the seed-slide D in the bottom of the hopper, and is used to shut off the seed-supply to the spout G when it may be desired to stop sowing the same. To the front of the spout G is attached the furrow-openers H H′, the covers I being arranged in the rear, as shown, Fig. 1.

The advantages of my invention will be readily seen, inasmuch as the seed-slide is operated by the bearing-wheel, through the medium of the crank-shaft and pitman, without the aid of cog-gearing of any kind, or other complicated parts, as has heretofore been employed in machines used for a similar purpose.

The construction and arrangement of the several parts is such as to secure a most simple and efficient operation, not liable to become disarranged or get out of order, combined with a ready adaptation to the purpose intended.

Having thus described my invention, what I claim as new, and desire to secure by Letters Patent, is—

The combination of the frame B, having openings $a$ and $b$, as described; bearing-wheel B, pitman C, and seed dropping slide D; the several parts being constructed and arranged to operate substantially in the manner as and for the purpose specified.

In testimony that I claim the foregoing as of my own invention I affix my signature in presence of two witnesses.

JOSEPH DANA.

Witnesses:
 FLORA E. BROWN,
 RICE M. BROWN.